Oct. 28, 1969  W. W. LEVY  3,475,652
DUAL PHASE STATIC ELIMINATOR
Filed Dec. 5, 1966
FIG.1
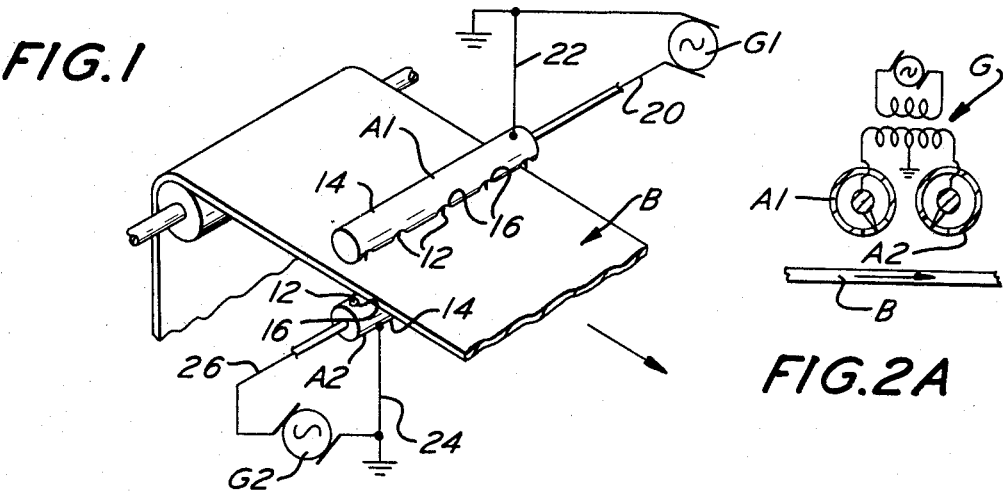
FIG.2A
FIG.2
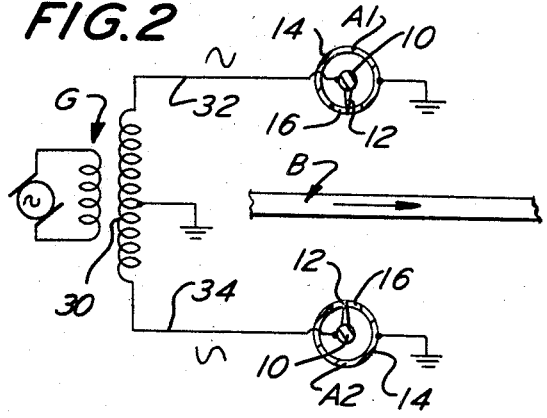
FIG.3
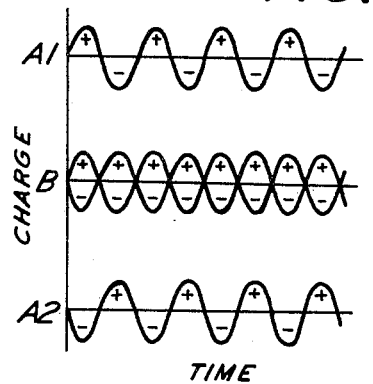
FIG.4
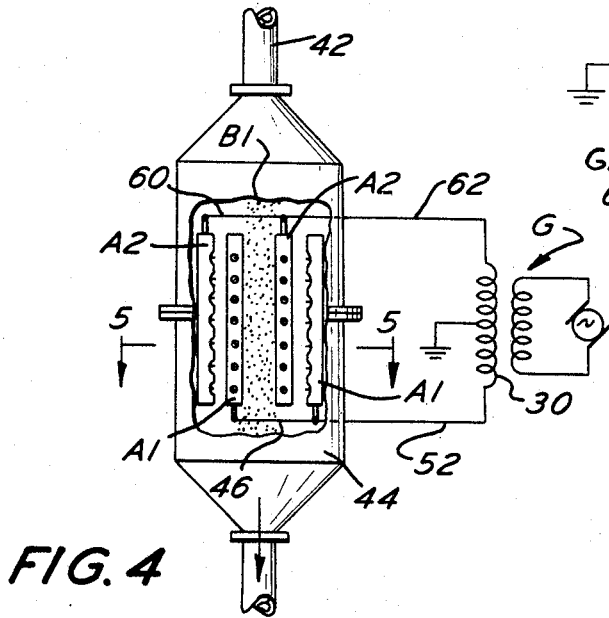
FIG.5
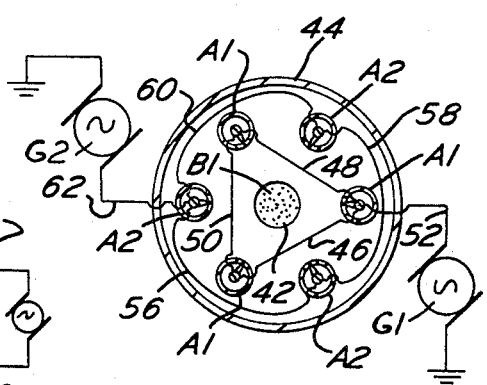
INVENTOR
WARREN W. LEVY
BY
Belker Kimmelman & Meyerman
ATTORNEYS.

United States Patent Office 3,475,652
Patented Oct. 28, 1969

3,475,652
DUAL PHASE STATIC ELIMINATOR
Warren W. Levy, Cynwyd, Pa., assignor to The Simco Company, Inc., Lansdale, Pa., a corporation of Pennsylvania
Filed Dec. 5, 1966, Ser. No. 599,263
Int. Cl. H05f 3/06
U.S. Cl. 317—2
8 Claims

ABSTRACT OF THE DISCLOSURE

A dual or bi-phase system of static neutralization. Pairs of electrostatic discharging devices, such as multi-pointed bars, direct a stream of positive and negative ions toward a particular zone of moving surfaces. Alternating current high voltage is applied to each of the paired discharging devices but at 180° out-of-phase whereby the output of one of the pair is one-half cycle behind that of the other. Thus, while one of the paired devices delivers ions of a given polarity toward the moving surface at any portion of a cycle, the other supplies ions of the opposite polarity.

Brief summary of the invention

This invention relates to static eliminators, and more particularly relates to an apparatus and method for neutralizing charges on rapidly moving articles and materials, such as conveyor belts, sheet stock and chemical and pharmaceutical powders.

In the field of static elimination, it is generally preferable to utilize alternating current power supplies having an A.C. output which is coupled to the static bars. That is, the cost of an A.C. power supply is far less than a D.C. power supply; it occupies less space; and it operates with at least the same degree of efficiency. Furthermore, the use of an A.C. power supply source permits the discharging needles of such static bars to be capacitatively coupled to the source of A.C. rather than a direct connection. Of course, a capacitative coupling provides a mode of "shockless" type operation in which the amplitude of current is limited by virtue of the impedance of the condenser coupling. Hence, operating personnel who accidentally short a portion of their body, such as a finger, across the discharging points and ground, will not receive a shock of undue intensity. The reduction of the shock intensity also indicates lower energy of spark discharge which thereby permits use of the "shockless" type static eliminators in certain inflammable or explosive environments. See U.S. Patent Nos. 3,179,849 and 3,120,626.

However, it has been observed that where A.C. output static eliminator bars were used in the past for neutralizing statically developed charges on moving articles and materials, particularly rapidly travelling conveyor belts, sheet stock and granular or powdered chemicals, there was a failure to obtain neutralization on all portions of said moving articles. That is, even where the A.C. static bars were disposed on opposite sides of the rapidly moving articles, it had been noted that neutralization of the charges occurred only at regular intervals on the articles, but that, on the other hand, there was a failure to obtain neutralization in cyclic longitudinally-spaced zones intermediate the former. Measurement of the static charges on a moving belt even after being exposed to the output of A.C. static bars revealed longitudinally-spaced stripes of charged areas on such belts. It had also been noticed that the charged striped areas became even more pronounced at speeds in excess of 2000 lineal feet per second. Furthermore, increasing the A.C. frequency on the power supplies to such static bars did not diminish the cyclic effect.

It is therefore an object of this invention to provide a method and apparatus for totally neutralizing static charges on rapidly moving articles and materials.

Another object of this invention is to provide a dual phase static elimination system in which static charged moving articles and sheets will be neutralized without evidence of cyclic charged or non-neutralized zones.

Yet another object of this invention is to provide a static elimination system and method in which uniform neutralization on rapidly moving articles and materials is accomplished with a 60 cycle A.C. output from the static bars.

Still another object of this invention is to provide an A.C. static eliminator system and method in which the efficacy of neutralization is not impaired by increasing the speed of the charged moving articles and materials.

A still further object of this invention is to provide a static eliminator system for rapidly moving articles and sheets in which a relatively "shockless" and low short circuit current operation may be afforded.

Other objects of this invention are to provide an improved device and method which is easily and economically produced and performed, that is sturdy in construction, and which is highly efficient and effective in operation.

Description of figures

With the above and related objects in view, this invention consists of the details of construction and combination of parts as will become fully understood from the following detailed description when read in conjunction with the accompanying drawing in which:

FIGURE 1 is a perspective view of a dual phase static eliminator system embodying this invention as applied to a moving conveyor belt.

FIGURE 2 is a sectional view, and partly diagrammatic, illustrating another electrical schematic hook-up for the dual phase system. FIGURE 2a is a modified form of FIGURE 2.

FIGURE 3 is a graphical representation of the time versus charge curve of the system as existing at the output of the static eliminator bars and at the interface of the moving belt.

FIGURE 4 is a perspective view, and partly broken away, of the dual phase system applied to a conduit of conveyed powder particles.

FIGURE 5 is a sectional view taken along lines 5—5 of FIGURE 4.

Detailed description

Referring now in greater detail to the drawings in which similar reference characters refer to similar parts, I show a dual phase or bi-phase static eliminator system, generally designated as A, in which a statically charged moving belt, generally designated as B, is exposed to an alternating current ionization system.

The dual phase system A comprises at least a pair of static bars A1 and A2, each of which includes, for example, a central conductive rod 10, having a plurality of spaced needles 12 outwardly extending therefrom, and a conductive casing 14 coaxially disposed about the rod and electrically insulated therefrom. The casing 14 may be cylindrical and have a plurality of spaced circular apertures 16 concentrically disposed about the needles, such as the device shown in U.S. Patent No. 2,163,294. The static bars A may also be of the type in which the longitudinally-spaced needles are disposed intermediate laterally-spaced parallel rails, such as shown in U.S. Patent No. 3,137,806, or the static bars A can be of the "shockless" type, demonstrated in U.S. Patent No. 3,120,626. It is not in the nature of the bars themselves that constitute the instant invention, but in their arrangement with respect to the moving article and in the mode of electrical phase connection.

In FIGURE 1, the static bars A1 and A2 are arranged on opposing sides of the belt B with the needles 12 spaced therefrom and facing each other. An A.C. high voltage power supply G1 has its hot side coupled to the rod 10 of static bar A1 through lead 20 and its grounded side coupled to the casing 14 through lead 22. The power supply G1 is conventional in every respect and may constitute a transformer whose primary is connected to a 110 volt or 220 volt, 60 cycle source of alternating current, and whose secondary can deliver an A.C. output in the range of 2000 to 15,000 volts. The output of the static bar A1 is demonstrated by the uppermost curve of FIGURE 3.

The static bar A2 is hooked up to a high voltage generator or power supply G2 in generally the same manner by connecting the rod 10 and casing 14 through leads 24 and 26 to the ground and hot side respectively of the generator. However, while the generators G1 and G2 are substantially identical and have substantially the same amplitude or magnitude of output, the two outputs are 180° out-of-phase. The output of static bar A2 is generally demonstrated by the lowermost curve of FIGURE 3. Therefore, when the output of static bar G1 is positive, the output of generator G2 at the same point in time will be equal in amplitude but negative. Accordingly, with respect to time, the outputs of the two static bars A1 and A2 will always be equal in amplitude but opposite in polarity with respect to each other. The central curve of FIGURE 3 represents the condition of the ionizing charge at the belt interface.

In FIGURE 2, the pair of static bars A1 and A2 are coupled across a single A.C. generator or power supply G which includes a center-tapped transformer 30. The primary of the transformer 30 is connected across a source of 110 volt A.C. power, for example. The ends of the secondary coil are respectively connected to the rods 10 of the static bars A1 and A2 through leads 32 and 34. The center tap of the transformer 30, and the casings 14 are all connected to ground. As is apparent from inspection of the circuit hook-up, the output of the static bar A2 is 180° out-of-phase with that of bar A1 since the input from the transformer 30 to each of them is 180° out-of-phase. However, FIGURE 2, while demonstrating the use of a single generator source G, it does show the two static bars A1 and A2 facing opposing surfaces of the belt B and facing each other. Again, the output of the respective static bars A1 and A2 and the interfacial representation of the charge at the belt B is set forth in FIGURE 3.

In FIGURE 2A, there is shown a single-generator dual-phase hook-up to the pair of static bars A1 and A2, but with the static bars now on the same side of the belt. In this embodiment, the points of the needles 10 are directed toward the same imaginary line transverse to the direction of belt movement. Since the outputs of the two static bars A1 and A2 in this embodiment are 180° out-of-phase with each other, the summation of charge at the upper surface of the belt is again represented by the center curve of FIGURE 3.

In FIGURES 4 and 5, the dual-phase static eliminator system is shown applied to a stream of powdered material B1 being delivered through a conduit 42. Where required, the conduit 42 may be bellied out to include an enlarged section 44 for accommodating a battery of the static bars A1 and A2. In this embodiment, three of the static bars A1 have their rods 10 coupled to an A.C. power supply of a particular phase whereas a triplet of static bars A2 are coupled to a source of alternating current power 180° out-of-phase with that applied to the bars A1. Jumper leads 46, 48 and 50 interconnect the rods 10 of bars A1 to one phase of alternating current high voltage through lead 52. Jumpers 56, 58 and 60 interconnect the rods 10 and points 12 of static bars A2 to a source of A.C. high voltage 180° out-of-phase with that of the A1 system through lead 62. Once more, the casings 14 of all of the bars are grounded as is the low side of the high voltage.

As is evident from an examination of the central curve of FIGURE 3, the pair of static bar systems A1 and A2 continuously deliver a field of ions to the charged belt B or material B1 at all times. When bar A1 is delivering positive ions to the moving surface during any portion of its cycle, bar A2 is supplying negative ions at the same time. Conversely, static bar A1 immerses the surface with negative ions while bar A2 delivers positive ions at the corresponding portion of the cycle. Note also that the opposite polarity ions which are emitted by the respective bars A1 and A2 tend to attract each other so as to synergistically flood the zone with a field of ions of both types. Since a surplus of charged positive and negative ions are being emitted at all times, instead of ions of a particular polarity during each half cycle, the net effect is to neutralize completely and effectively any static charges built up on the belt B or other moving surface without creation of cyclic stripes of a particular polarity thereon. The method and apparatus of the instant invention are particularly effective and most manifest at high speeds.

It is also to be noted that this dual phase or bi-phase system can be employed with ionizing air nozzles, such as are shown in prior U.S. Patent No. 3,156,847.

Although this invention has been described in considerable detail, such description is intended as being illustrative rather than limiting, since the invention may be variously embodied, and the scope of the invention is to be determined as claimed.

What is claimed is:

1. A method for neutralizing static charges on rapidly moving articles and materials comprising the steps of directing a pair of static discharging means at a particular zone transverse to the direction of travel of the articles and materials, applying an alternating current high voltage with respect to ground of a particular phase to one of the discharging means, and applying an alternating current high voltage with respect to ground to the other of said discharging means 180° out-of-phase with said high voltage applied to the first mentioned of said means whereby a stream of ions of one polarity will be directed at said zone simultaneously with a stream of ions of the opposite polarity so as to prevent cyclic charged or non-neutralized areas on such articles and materials.

2. The invention of claim 1 wherein the static discharge means are disposed on opposing sides of said articles and materials and face each other.

3. The invention of claim 1 wherein the static discharge means are disposed on the same side of said moving articles and materials and are directed along a line transverse to the direction of movement.

4. The invention of claim 1 wherein a 60 cycle A.C. input is applied to said static discharging means.

5. The invention of claim 1 wherein a center-tapped transformer is coupled at its opposing ends to the discharging elements of said respective static discharging means, and the center tap of said transformer is coupled to ground.

6. The invention of claim 1 wherein pairs of said discharging means are arranged in sets, one set having an output 180° out-of-phase with the other of said sets.

7. The invention of claim 6 wherein the discharging means are circumferentially-spaced about said zone.

8. The invention of claim 7 wherein the discharging means of one set are arranged alternately with the discharging means of the other set.

(References on following page)

References Cited

UNITED STATES PATENTS

| | | | |
|---|---|---|---|
| 7,671 | 9/1850 | Metcalf | 317—2 |
| 824,339 | 6/1906 | Chapman | 317—2 |
| 3,086,145 | 4/1963 | Hood | 317—2 |
| 3,320,479 | 5/1967 | Owens | 317—2 |

FOREIGN PATENTS

| | | |
|---|---|---|
| 450,020 | 7/1950 | Italy. |
| 516,383 | 1/1940 | Great Britain. |

LEE T. HIX, Primary Examiner

W. M. SHOOP, Jr., Assistant Examiner

UNITED STATES PATENT OFFICE
CERTIFICATE OF CORRECTION

Patent No. 3,475,652                                        October 28, 196

Warren W. Levy

It is certified that error appears in the above identified patent and that said Letters Patent are hereby corrected as shown below:

Column 1, line 70, "second" should read -- minute --.

Signed and sealed this 16th day of February 1971.

(SEAL)
Attest:

Edward M. Fletcher, Jr.                        WILLIAM E. SCHUYLER, JR
Attesting Officer                                  Commissioner of Patents